United States Patent [19]

Porter

[11] 4,375,264

[45] Mar. 1, 1983

[54] METHOD AND APPARATUS FOR SEGREGATING AND SEPARATELY RECOVERING SOLIDS OF DIFFERENT DENSITIES

[75] Inventor: Herschel F. Porter, Rehobeth Beach, Del.

[73] Assignee: Doxsee Food Corp., Baltimore, Md.

[21] Appl. No.: 265,066

[22] Filed: May 19, 1981

[51] Int. Cl.³ .............................................. B03B 5/28
[52] U.S. Cl. ................................... 209/606; 209/173; 209/906; 209/932
[58] Field of Search ................ 209/3.1, 906, 932, 162, 209/172, 173, 208, 645, 163, 164, 606; 99/570

[56] References Cited

U.S. PATENT DOCUMENTS

| | | |
|---|---|---|
| 768,035 | 8/1904 | Delprat . |
| 1,209,654 | 12/1916 | Anderson . |
| 2,530,676 | 11/1950 | Berg et al. ............................ 209/173 |
| 2,808,615 | 10/1957 | Snow . |
| 2,945,589 | 7/1960 | Olney . |
| 3,479,281 | 11/1969 | Kikindal et al. . |
| 3,722,035 | 3/1973 | Hanks . |
| 3,822,015 | 7/1974 | Hsieh et al. ........................ 209/173 |
| 4,169,787 | 10/1979 | Gunnerson ........................ 209/173 |
| 4,225,424 | 9/1980 | Patzlaff ............................... 209/3.1 |
| 4,253,941 | 3/1981 | Lawson ........................... 209/173 X |
| 4,294,691 | 10/1981 | Patzlaff ............................ 209/932 X |

Primary Examiner—Allen N. Knowles
Attorney, Agent, or Firm—Roylance, Abrams, Berdo & Farley

[57] ABSTRACT

A method and apparatus is provided for segregating and separately recovering fractions of a mixture of low density solids and high density solids, such as mixtures of clam shells and free detached clam meat. The mixture of solids is submerged in a laminar flowing stream of liquid which has a specific gravity about the same as that of the low density solids and such that the low density solids are substantially non-buoyant in the liquid. The bottom of the laminar flowing stream of liquid is defined in part by an upper foraminous conveyor surface which is moving in the same direction as the laminar flowing stream. The mixture of solids is flowed across a turbulent zone of rising air bubbles, and low density solids are removed from the top of the liquid and high density solids are removed from the bottom of the laminar flowing stream. Advantageous apparatus embodiments are provided for conducting the method.

26 Claims, 3 Drawing Figures

METHOD AND APPARATUS FOR SEGREGATING AND SEPARATELY RECOVERING SOLIDS OF DIFFERENT DENSITIES

BACKGROUND OF THE INVENTION

1. Field of the Invention

The invention relates to a method and apparatus for the segregation and separate recovery of low density solids and high density solids from mixtures of the same. More specifically, the invention involves segregation and separate recovery of substantially non-buoyant low density solids in a liquid medium.

2. Description of the Prior Art

Liquids and especially water have long been used in segregating light and heavy fractions of mixtures. Where one particular faction of the mixture has a density which is about the same as that of water, workers in the art have typically increased the density of water by adding salt or brine to the water. The brine solution is then used to recover the light or low density solids by floatation. Such brine floatation techniques have long been used in the mollusk industry for the recovery of clam meats and oyster meats from mixtures of free meat and shell. The mollusk meats have a bulk density which is about that of water.

Brine solutions often adversely affect the quality of food products and there have been continuous efforts in the art to discover and design other techniques for segregating and recovering solids such as clam and oyster meats which have bulk densities about the same as water.

The so-called "oyster blower" which consists of an open-top tank containing water and having a perferated spreader pipe in its bottom by which air is continuously bubbled through the water has been used in the oyster industry and in the clam industry to separate pieces of shell and sand from oyster and clam meats. Typical uses of the "oyster blower" apparatus involve introducing whole oysters or ground or whole clams into the top of the tank at one end thereof and floating the meats to the other end of the tank during a time of from about one-half to several minutes. Such techniques are discussed in U.S. Pat. No. 2,808,615 to H. F. Snow.

U.S. Pat. No. 3,722,035 Hanks discloses a method and apparatus which is said to remove attached meat from the shells of bivalved mollusk. Whole clams are conditioned to partially open their shells and the clams with meat lightly adhering to the shells are introduced into a tank of water containing upwardly rising air bubbles. The conditioned mollusks fall through the water through the zone of rising air bubbles which is said to cause both the separation of meat from the shell and floatation of the clam meat to the top of the tank where it is removed. Systems such as the oyster blower system, the Hanks system and various other attempted methods which rely on air bubbles for floating and segregating mollusk meat still have need for considerable improvement.

Thus, when attempts are made to operate such systems rapidly, the quality of the segregation of the light solids and the heavy solids decreases resulting either in loss of recoverable meat or an ineffective segregation, i.e. the inclusion of significant amounts of contaminants such as shells along with the meat fraction. Thus, there is a continuing need for improvement in the art.

SUMMARY OF THE INVENTION

There has now been discovered a method and apparatus which provides for the rapid and effective segregation and separate recovery of low and high bulk density fractions of a mixture. The method of the invention involves submerging a mixture of low density and high density solids at an introduction location in a laminar flowing stream of liquid. The liquid has a specific gravity about the same at that of the low density solids which in turn, are substantially non-buoyant when submerged in the liquid. Thus, the light or low density solids have little or no tendency to float when so submerged. The bottom of the laminar flowing stream of liquid is defined in part by an upper foraminous conveyor surface which is located in a substantially horizontal plane and is moving in the same direction as the laminar flowing stream. The mixture of solids is flowed by the laminar flowing stream above the conveyor surface across and at least partially through a turbulent zone of rising air bubbles which is downstream of the introduction location. The air bubbles are introduced into the laminar flowing stream from below the foraminous conveyor surface. As the mixture meets and flows at least partially through the turbulent zone of rising air bubbles the laminar flowing stream expands to an increased depth or thickness and the low density solids rise and are continuously recovered from the top of the laminar flowing stream at a location in or adjacent to the downstream end of the turbulent zone of rising air bubbles. The high density solids are removed from the bottom of the laminar flowing stream of liquid.

The method of the invention, discovered after considerable expenditure of effort and experimentation, is especially useful in the treatment of mixtures including food products wherein the liquid used is substantially salt-free water. The method represents a considerable improvement in the art in that it can readily be performed both rapidly and efficiently. For instance when whole clam meats are to be recovered from a mixture of broken clam shells and free detached clam meat, the mixture can successfully be treated at feed rates up to and exceeding 250 pounds per minute.

The invention also involves a combination apparatus including an upright retaining means for retaining body of liquid. At an upstream end of the retaining means there are provided means, such as a manifold, for providing a laminar flowing stream of liquid flowing downstream through a substantially horizontal zone in the retaining means. Also at the upstream end of the retaining means are means for submerging a mixture of low density and high density solids in the laminar flowing stream of liquid. The bottom of the zone of the laminar flowing stream of liquid is defined at least in part by a first conveyor means in the retaining means which comprises an upper foraminous conveyor surface located in a horizontal plane and adapted to convey in the direction of flow of the laminar flowing stream of liquid. Downstream of the submerging means are means for providing rising air bubbles in the laminar stream of liquid, the air bubble means being below the upper foraminous conveyor surface and being adapted to flow air bubbles up through the upper conveyor surface. Means for continuously removing low density solids from the surface of the laminar flowing stream of liquid are located downstream of the most upstream end of the air bubble means and either upstream or adjacent to the downstream end of the air bubble means. Means for continuously removing heavy solids from a lower portion of the retaining means are also provided.

BRIEF DESCRIPTION OF THE DRAWINGS

In the drawings which form of the original disclosure of the invention.

DETAILED DESCRIPTION OF THE METHOD

Those skilled in the art will recognize that the method of the invention is useful for segregation and separate recovery of many types relatively low density and relatively high density solids and especially food products, such as mixtures of mollusk shells and free, detached mollusk meats; mixtures of peas and thistle buds; mixtures of peas or beans and their pods; mixtures of various other food products with trash, and the like. The method is especially useful in processes where brine floatation techniques have previously been used, the method of the invention allowing the substitution of fresh water for the brine solution.

Figure 1:
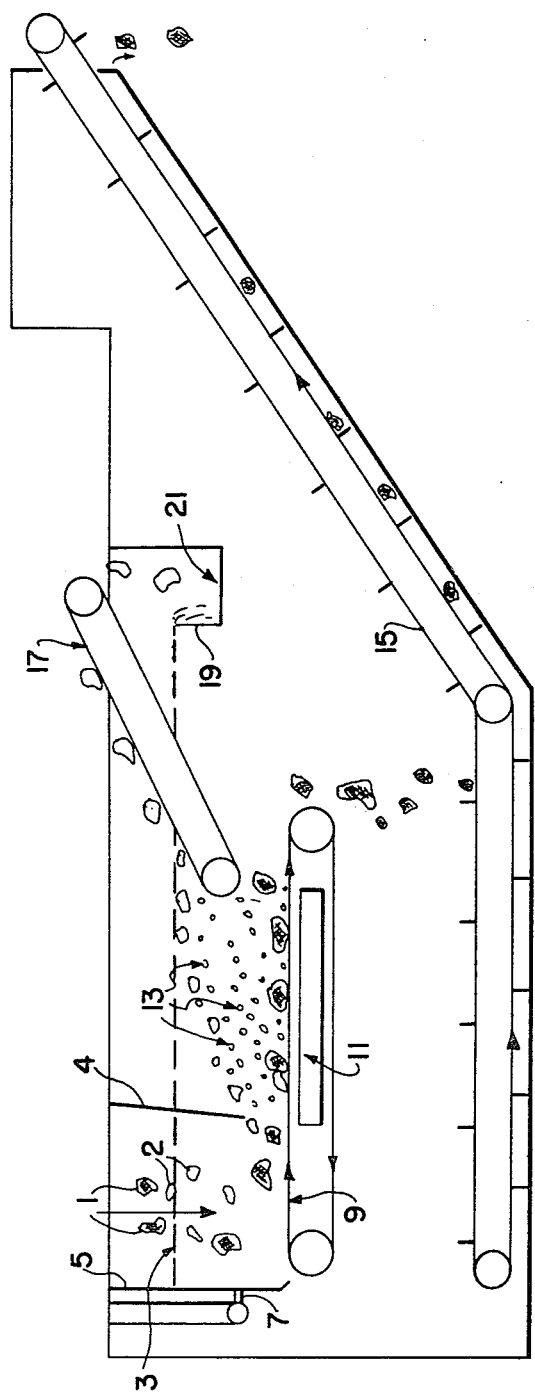
FIG. 1 diagrammatically illustrates an apparatus embodiment for carrying out the method as applied to the segregation and separate recovery of clam shells and free clam meat.

FIG. 1 diagrammatically illustrates a preferred apparatus embodiment for carrying out the method as applied to the segregation of clam shells and free, detached clam meat wherein the liquid medium used is substantially fresh water. With reference to FIG. 1 a mixture of clam shell 1, either whole or broken, and free, detached clam meat 2 is introduced below the surface 3 of water. Various methods and apparatus are known to those skilled in the art for providing mixtures of clam shell and clam meat, such as impact apparatus which breaks shells into particles and fragments; radiant ovens and steam ovens for causing clams to open and withdraw adductor muscles from the shell; ultrasonic treatment devices and the like. Any of such methods or apparatus can be used to provide the mixture of claims shell and free detached clam meat. An advantageous means for providing a mixture of free clam meat and broken shells is an impact apparatus of the type disclosed in U.S. Pat. No. 3,007,801 Lapeyre and in U.S. Pat. No. 3,662,432 Wenstrom et al. These devices involve the use of a rapidly rotating series of paddles which throw whole clams, scallops and the like against side walls or other paddles, breaking mollusk shells and tearing the meat free of the shell.

With reference again to FIG. 1 the mixture of free clam meat and clam shell is introduced below the water surface between baffle 4 and back wall 5. As the mixture drops through the water it meets a laminar flowing stream of water provided by water manifold 7 which forces the meat and shell mixture forwardly and beneath the bottom of baffle 4. It has been found to be critical in conducting the method of the invention that the mixture of solids be fully submerged in the laminar flowing stream prior to contacting the turbulent zone of rising air bubbles. The combination of a submerged baffle downstream of manifold 7 and upstream of the air bubble introduction means can suitably accomplish this objective; however, other steps for accomplishing submergence prior to the turbulent zone of air bubbles will be known to those skilled in the art.

After the mixture becomes enveloped in the laminar flowing stream provided by water manifold 7 it is moved forwardly by means of the laminar flowing stream of water while upper conveyor surface 9 maintains the meat and shell at a height above the surface of air blower 11. As the mixture moves forward it encounters the turbulent zone of rising air bubbles 13 provided by air manifold 11 beneath the upper foraminous conveyor surface 9 causing the laminar flowing stream to expand and the meat to rise. Advantageously the turbulent zone of rising air bubbles begins in close proximity to the location of the baffle or in close proximity to the location where the solids are otherwise fully submerged, i.e., at a downstream distance from the baffle of less than about one foot, more advantageously less than six inches, even more advantageously less than about two inches. Shell which does not rise is carried forward by the laminar water flow and conveyor surface 9 to the end of the lower conveyor where it sinks and is removed by drag chain 15. Separated meat is continuously removed from the surface of turbulent water in any suitable manner such by the means of a conveyor 17. Advantageously, the relatively low density clam meat, removed from the water surface can be continuously dropped into a trough 21 where it is carried away by water flowing over weir 19 for further treatment such as debellying, grinding operations and the like. Water continuously flowing over weir 19 can be recovered and recirculated. In such instances, it is desirable to add a defoamer to the continuously recirculating water in order to prevent foam build-up in the turbulent water zone which hampers separation of meat. Defoamers are known to those skilled in the art. A conventional defoamer of the silica-silicone type is advantageously used when water is recycled.

Advantageously, the turbulent zone of rising air bubbles has a length of from about 10 to about 30 inches, most advantageously about 20 inches. This avoids low density solids floated to the surface of the turbulent zone from falling back beneath the surface of the zone. It is also advantageous for the distance from the bottom of the laminar flowing stream of liquid to the surface of the water, i.e. the distance between upper conveyor surface 9 and the top of the turbulent zone, be no more than about two feet under static conditions. More advantageously the height is about one foot and most advantageously about 10 inches under static conditions. It is also advantageous to insure submergence of all solids to a depth from liquid surface of at least about four inches up to about 20 inches, more advantageously about six inches. The provision of the baffle extending in the liquid to the desired depth can be used to insure submergence. This arrangement insures a more effective segregation and recovery of light solids.

DETAILED DESCRIPTION OF APPARATUS EMBODIMENTS OF THE INVENTION

Figure 2:
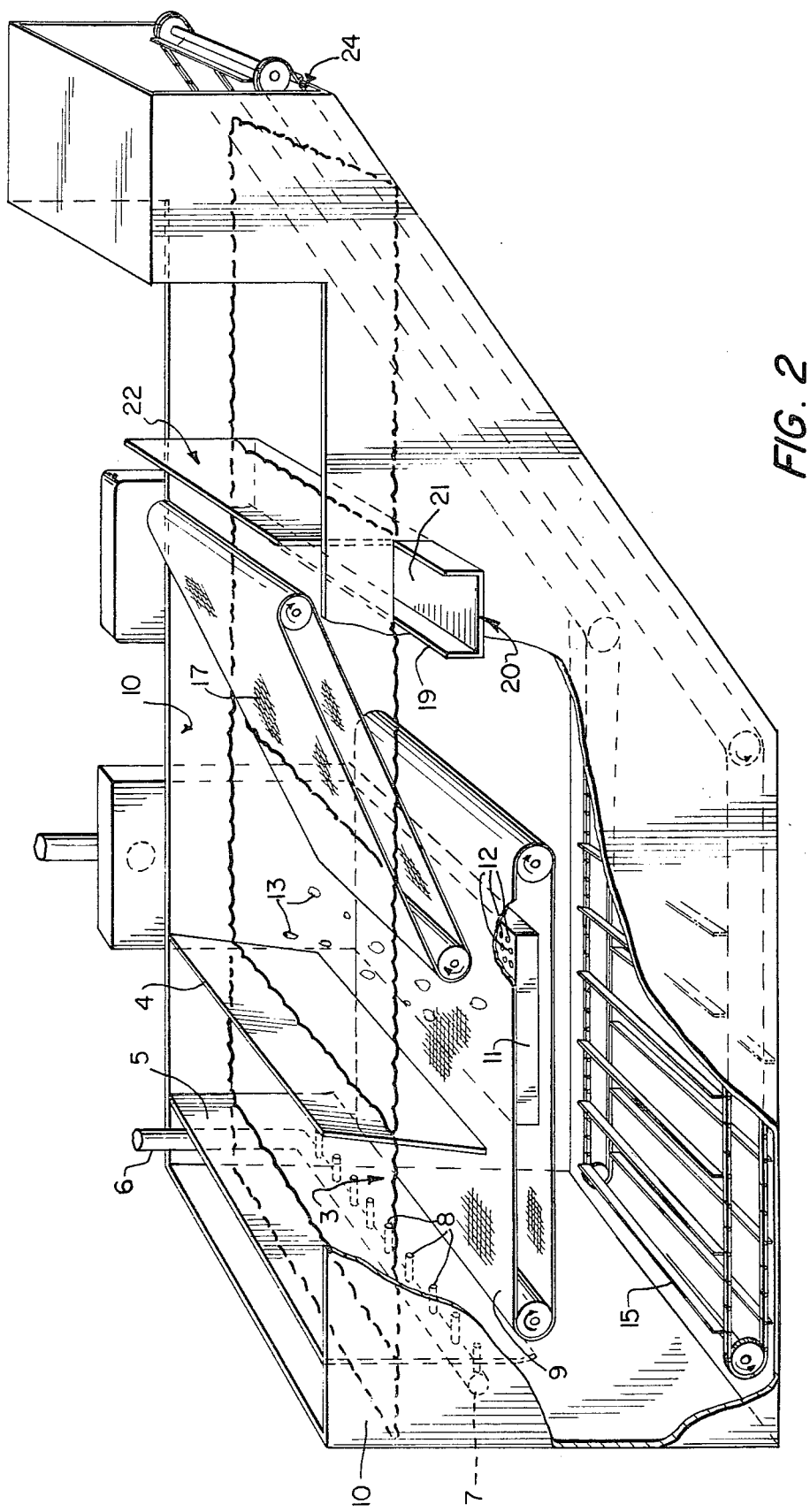
FIG. 2 is a perspective view with parts shown in cut-away, of an apparatus embodiment of the invention.

Various advantageous embodiments of the invention are shown in FIG. 2. An upright container having imperforate walls 10 which are shown in partial cut-away, holds a body of water, the surface 3 of which is below the top of the container. Water manifold 7 supplied by pipe 6 communicates with the interior of the retaining means through colinear holes 8 which extend laterally across back wall 5, from side wall to side wall. The manifold thus provides a laminar flowing stream of liquid at a substantially constant height just above the bottom of baffle 4. As a mixture of low density and high density solids are introduced into the container between the back wall 5 and baffle 4 they are forced by the water flowing through holes 8 and further by means of the moving upper foraminous surface 9 of the lower conveyor, underneath the bottom of baffle 4 which is connected to the side walls, extends into the retaining means and terminates above the upper surface 9 of lower conveyor. Advantageously the distance between the bottom of baffle 4 and the upper foraminous surface 9 is less than about one foot, more advantageously about six inches. At a location spaced downstream of the introduction location which is defined is the embodiment shown, by the upstream side of baffle 4 and the downstream side of wall 5, there is an air manifold or blower 11 having a mutiplicity of holes 12 for forcing air bubbles into the laminar flowing stream of liquid. The air holes advantageously begin at a distance of less than one foot downstream of the submerging means, e.g. baffle 4, more advantageously less than about six inches, even more advantageously less than about two inches. The width of the air manifold is suitably the same as the width of the laminar flowing stream, and the holes in the blower box for admitting air to the liquid can suitably be spaced about three inches apart, both lengthwise and across. Air manifold 11 and holes 12 are located beneath the upper foraminous surface 9 of the lower conveyor and advantageously, the upper foraminous conveyor surface rests directly on the top of the blower box, this arrangement insuring most effective passage of the air bubbles 13 up through the foraminous conveyor surface 9.

As shown, an upstream portion of the upper foraminous conveyor surface is located directly below the introduction location which prevents any of the solids which are being introduced into the liquid downwardly and transversely to the laminar flowing stream of liquid, from falling below the level of the air manifold 11 and air holes 12.

An upper conveyor 17 extends partially into and partially out of the main container and the plane of the upper surface of the upper conveyor inclines from a location in the retaining means to a location out of the main container. The upper surface of the upper conveyor 17 is adapted to convey in the downstream stream direction and upwardly and out of the main container. Solids conveyed by the upper conveyor continue to the end of the conveyor where they drop down into trough 21 which is defined in part by weir 19 and back wall 22. Weir 19 also serves to maintain the water height substantially constant by continuously removing water higher than the top of the weir. Water overflowing the weir assists in carrying solids dropped from conveyor 17 into the trough out of ther apparatus by means of flume 20. The lower upstream end of the upper conveyor 17 is located below the upper edge of weir 19 and thus below the water level.

Drag chain 15 is located below the lower conveyor and in a relatively quiescent zone of liquid. Heavy solids which pass beneath the upper conveyor and continue to the end of the lower conveyor will fall from the downstream end of the lower conveyor into the quiescent lower zone where drag chain 15 carries them out of the downstream end 24 of the apparatus. The drag chain not only provides for the continuous removal of heavy solids, but also effects continuous cleaning of the device by continuously removing accumulated dirt and trash from the bottom of the apparatus.

Advantageously, the distance between the upper surface 9 of the lower conveyor and the surface of the water 3 will be less than about 2 feet, more advantageously about one foot, most advantageously about 10 inches. The distance between the upstream end of the air manifold 11 and the location where solids are first removed from the turbulent zone will advantageously be between about 10 and about 30 inches, more advantageously about 20 inches. The width of the laminar flowing stream and blower box 11 can be varied as desired; efficient results will readily be obtained with a width of about 40 inches. The apparatus shown in FIGS. 2 and 3 can retain about 550 gallons of water under static conditions, however, obviously the volume of the retaining means can widely vary.

The mesh of the lower foraminous conveyor surface 9 will advantageously be relatively fine to avoid plugging of the mesh with sand, dirt, pieces of shell, or the like. The foraminous mesh of the upper conveyor surface 17 will vary depending on the material being recovered at the top of the liquid. Where large clam meats are being recovered from small pieces of shell, it has been found that openings of about ⅞ inches are effective to allow small pieces of shell to drop back through to the liquid while still allowing the upper conveyor surface 17 to retain all of the clam meat. The distance between the submerged downstream end of the upper conveyor and the top of the lower conveyer will advantageously be less than about a foot, more advantageously between 4 and 6 inches.

Figure 3:
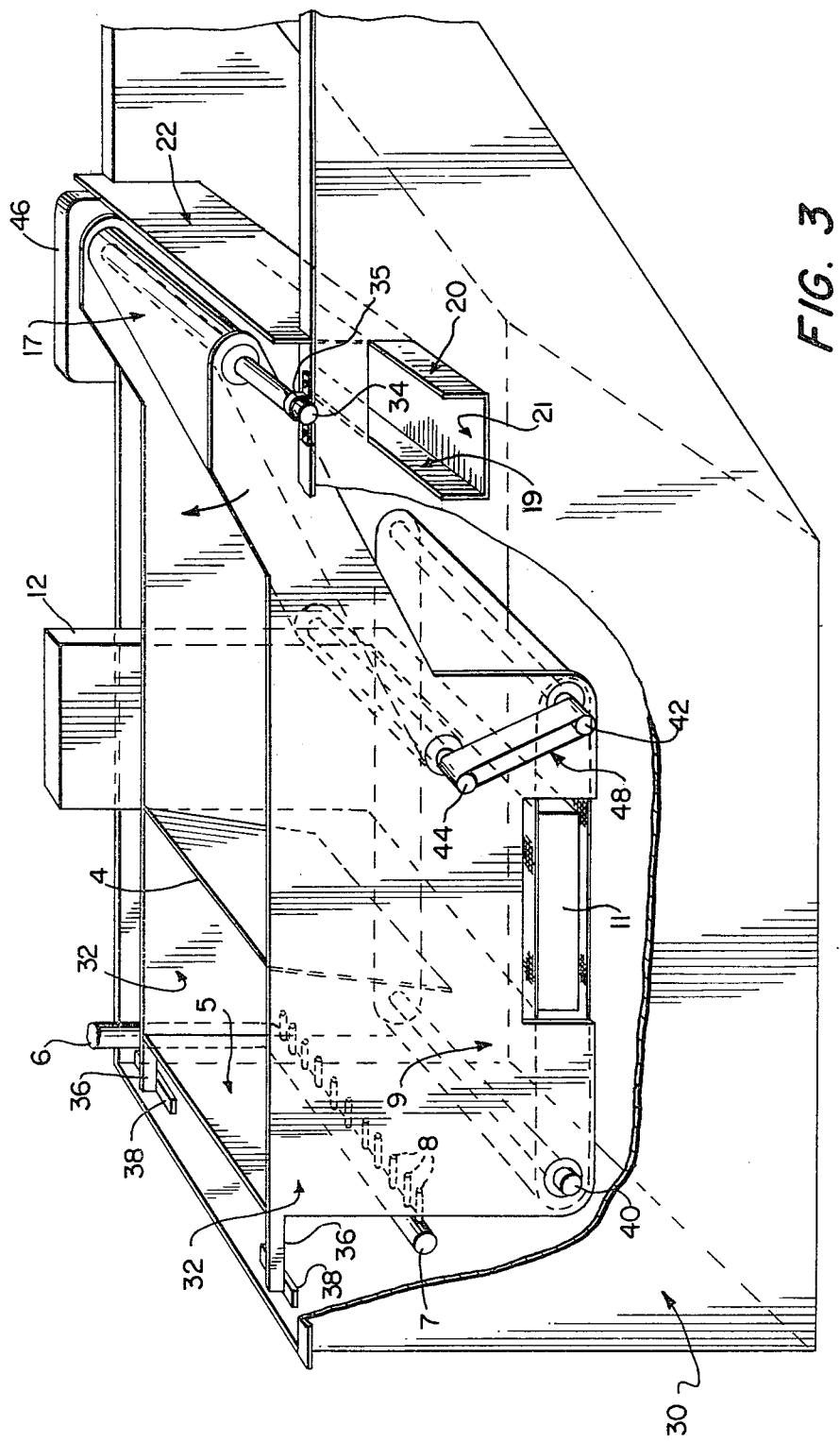
FIG. 3 is a perspective view, with parts shown in cut-away, of another embodiment of the apparatus of the invention.

Another advantageous embodiment of the invention is shown in FIG. 3 in which there is provided an outer container having imperforate walls 30, shown in partial cut-away. Inner side walls 32 and back wall 5 are connected to conveyors 9 and 17, baffle 4, air manifold 11 and air supply box 12. The entire inner assembly can be pivoted upwardly about axle 34 of conveyor 17 for cleaning, repairs and the like. Axle 34 is held in position by clamp 35. Suitably a nylon bearing (not shown) is provided around axle 34 and under clamps 35. Bars 36 extending from the sidewalls rest on supports 38 and together with axle 34 support the entire inner assembly when the inner assembly is in the lower, operating position. Axles 40 and 42 of the lower conveyer, and axle 40 of the upper conveyer, each extend through sidewall 32 but not through outer wall 30. This arrangement avoids leakage problems around the axles. Bearings (not shown) are provided around the axle ends, between the axles and side walls. The upper conveyor 17 is driven by a motor (not shown) in housing 46. The lower axle 44 of the upper conveyor is connected by pulley 48 to axle 42 of the lower conveyor so that both the upper and the lower conveyor are powered by the same motor. Wall 22 of trough 21, weir 19 and flume 20 are all connected with the outer container, i.e. to walls 30.

Operation of the apparatus shown in FIGS. 2 and 3 is advantageously conducted by introducing the solids into the apparatus between baffle 4 and backwall 5 at any suitable rate. Preferably, the motor housed in housing 46 which controls the rate of speed of upper conveyor 17 and lower conveyor 19 is provided with a means for continuously varying the speed of the motor as desired. Likewise, air supply box 12 or pipe leading thereinto is advantageously provided with a baffle or vent which allows variation of the rate of flow of air into blower 11. As material is introduced into the laminar flowing stream of liquid and floated to the top of the water, the rate of speed of conveyor can be increased when solids are not being removed as quickly as they are being floated upwardly. The heavy solids being removed by means of drag chain 15 can be monitored to determine whether light solids are being lost with the heavy solids. If so, the rate of air flow through air manifold 11 can be increased to the point where some heavier solids are also being floated and thereafter decreased back to the rate at which no heavy solids are be floated.

The method and apparatus of the invention have been effectively used to readily segregate clam meat from clam shells at a rate of about 250 pounds per minute and such rate can readily be increased to rates as great as 500 pounds per minute. When the method and apparatus are operated to segregate 250 pounds per minute of a clam shell and clam meat mixture, a water throughput rate of about 225 gallons per minute has been used. The pounds per minute segregation rate at which the method can be conducted and the apparatus operated will in part depend upon the densities of materials introduced into the apparatus. However, even when it is desired to separate relatively light solids from other heavier but still relatively light solids surprisingly high segregation and recovery rates can be achieved even though the apparatus is relatively small.

Although the invention has been described in considerable detail with specific reference to certain preferred embodiments, variations and modifications can be made without departing from the scope of the invention as described in the foregoing specification and defined in the appended claims.

What is claimed is:

1. In a method of segregating and separately recovering fractions of a mixture of low bulk density and high bulk density solids the combination of steps comprising
submerging a mixture of low bulk density and high bulk density solids at an introduction location in a laminar flowing stream of liquid,
the liquid having a specific gravity about the same as that of the low bulk density solids and the low bulk density solids being substantially non-buoyant when submerged in the liquid;
the laminar flowing stream of liquid comprising a bottom defined at least in part by
providing a turbulent zone of rising air bubbles in in the laminar flowing stream of liquid downstream of the introduction location, the air bubbles being introduced from below the upper foraminous conveyor surface;
flowing the mixture at least partially through the turbulent zone of rising air bubbles;
continuously recovering the low bulk density solids from the top of the liquid at a location in or adjacent to the downstream end of the turbulent zone of rising air bubbles; and
removing the high bulk density solids from the bottom of the laminar flowing stream of liquid.

2. The method of claim 1 wherein the mixture of low density and high density solids is submerged in the laminar flowing stream of liquid by being introduced downwardly into, and in a direction transverse to the direction of flow of the laminar flowing stream of liquid.

3. The method of claim 2 wherein the upper foraminous surface of the first conveyor means includes an upstream portion thereof directly below the introduction location.

4. The method of claim 3 wherein the liquid is substantially salt-free water.

5. The method of claim 4 further comprising:
continuously removing water at a downstream end of the laminar flowing stream of water;
adding a defoamer to the water; and
recycling the water to provide at least a part of the laminar flowing stream of water.

6. The method of claim 4 wherein;
the turbulent zone of rising air bubbles has a length of between about 10 and about 20 inches;
the distance from the bottom of the laminar flowing stream of water to the top surface of the water is less than about 2 feet under static condition; and
all solids are submerged to a depth of at least about four inches.

7. The method of claim 6 wherein;
the length of turbulent zone of rising air bubbles is about 10 inches; and
the distance from the bottom of the laminar flowing stream of water to the surface of the water is about 10 inches under static conditions.

8. The method of claim 7 wherein;
the mixture of low density and high density solids includes a food product.

9. The method of claim 8 wherein;
the mixture including a food product consists essentially of a mixture of whole or broken clam shell and free, detached whole clam meat.

10. The method of claim 9 wherein;
the turbulent zone of rising air bubbles begins in close downstream proximity to the location where the mixture of solids is fully submerged in the laminar flowing stream of liquid.

11. In an apparatus for segregating and separately recovering fractions of a mixture of low bulk density solids and high bulk density solids the combination comprising
means for retaining a body of liquid;
means at an upstream end of the retaining means for providing a laminar flowing stream of liquid flowing horizontally downstream through a zone in the retaining means;
means for submerging a mixture of low bulk density and high bulk density solids in the laminar flowing stream of liquid;
a first conveyor means in the retaining means comprising an upper foraminous conveyor surface located in a horizontal plane and adapted to convey in the direction of flow of the laminar flowing stream of liquid, the upper conveyor surface defining at least in part the bottom of the zone of laminar flowing liquid;
means downstream of the submerging means for providing rising air bubbles in the laminar flowing stream of water
the air bubble means being below the upper foraminous conveyor surface and adapted to flow air bubbles up through the upper foraminous conveyor surface;
means at an upper portion of the retaining means for continuously removing low bulk density solids from the surface of the laminar flowing stream of liquid;
the low bulk density solids removing means being located downstream of the most upstream end of the air bubble means and either upstream of, or adjacent to the downstream end of the air bubble means; and means for continuously removing heavy solids from a lower portion of the retaining means.

12. The apparatus of claim 11 wherein
the submerging means are adapted to introduce the solids mixture downwardly into, and in a direction transverse to the direction of flow of the laminar flowing stream of liquid.

13. The apparatus of claim 12 wherein
the upper foraminous surface of the first conveyor means includes an upstream portion thereof, located directly below the submerging means.

14. The apparatus of claim 11 further comprising
liquid removal means adapted to maintain substantially constant the water height in the retaining means.

15. The apparatus of claim 14 wherein
the liquid removal means comprises a weir defined in part by an upper overflow edge which determines the liquid height, the weir constituting the side wall of a trough extending out of the retaining means.

16. The apparatus of claim 15 wherein
the low density solids removing means comprises a second conveyor means which comprises a foraminous endless conveyor belt partially in and extending out of the retaining means, the plane of the upper surface of the second conveyor means being inclined from a location in the retaining means to a location out of the retaining means, the upper surface of the second conveyor means being adapted to convey in the downstream direction and upwardly and out of the retaining means.

17. The apparatus of claim 16 wherein
the downstream end of the second conveyor means terminates above the trough, said upper surface of the second conveyor means being adapted to drop the light solids into the trough.

18. The apparatus of claim 17 wherein
the lower upstream end of the second conveyor is located below the upper edge of the weir and upstream of the weir.

19. The apparatus of claim 18 wherein
the submerging means comprises an upstream zone in the retaining means, the upstream zone being defined in part by;
an upstream back wall, side walls and a downstream front wall which comprises a baffle connected to the side walls, the baffle extending into the retaining means and terminating above the upper surface of the first conveyor means.

20. The apparatus of claim 19 wherein
the upstream back wall of the zone of submerging includes water inlet means comprising colinear holes in the back wall communicating with liquid manifold means, the colinear holes extending generally transverse across the back wall in a direction from side wall to side wall, the height of the holes being essentially constant and above the terminating edge of the baffle.

21. The apparatus of claim 19 wherein
the upstream end of the air bubble means is located in close proximity to the baffle.

22. The apparatus of claim 20 wherein
the upper foraminous surface of the first conveyor means includes an upstream portion located directly below the submerging means.

23. The apparatus of claim 22 wherein
the means for continuously removing heavy solids from the lower portion of the retaining means comprises a drag chain located below the lower conveyor, the drag chain being adapted to carry the high density solids out of the downstream end of the retaining means.

24. The apparatus of claim 22 wherein
the upper foraminous surface of the first conveyor means rests directly on the means for providing rising air bubbles in the laminar flowing stream of water.

25. The apparatus of claim 24 wherein
the retaining means consists of an outer container having imperforate walls, the apparatus further comprising;
an assembly comprising side walls and upstream back wall which includes the water inlet means, the side walls being connectedly attached to the first and the second conveyor means, the baffle, and the air bubble means;
the assembly of side walls and back wall being adapted to pivot from an operating location within the retaining means to a location out of the retaining means.

26. The apparatus of claim 11 wherein
the upstream end of the air bubble means is located in close downstream proximity to the submerging means.

* * * * *

UNITED STATES PATENT AND TRADEMARK OFFICE
CERTIFICATE OF CORRECTION

PATENT NO. : 4,375,264

DATED : March 1, 1983

INVENTOR(S) : Herschel F. Porter

It is certified that error appears in the above-identified patent and that said Letters Patent is hereby corrected as shown below:

Column 7, line 46, after "in part by" and commencing on line 46 without paragraphing insert --an upper surface of a foraminous conveyor which upper foraminous conveyor surface is located in a substantially horizontal plane and is moving in substantially the same direction as the laminar flowing stream;--.

Signed and Sealed this

Fourth Day of October 1983

[SEAL]

Attest:

Attesting Officer

GERALD J. MOSSINGHOFF

Commissioner of Patents and Trademarks